United States Patent [19]

Herrera et al.

[11] Patent Number: 4,688,491
[45] Date of Patent: Aug. 25, 1987

[54] GROMMET ARRANGEMENT FOR OFFICE FURNITURE DESK TOPS

[75] Inventors: Jose Herrera; Brian S. Wurgler, both of Montgomery, Ill.

[73] Assignee: Allsteel Inc., Aurora, Ill.

[21] Appl. No.: 904,462

[22] Filed: Sep. 8, 1986

[51] Int. Cl.⁴ .............................................. A47B 35/00
[52] U.S. Cl. .................................... 108/50; 174/152 G
[58] Field of Search .............. 248/56; 16/2; 174/65 G, 174/152 G, 153.6; 108/50

[56] References Cited

U.S. PATENT DOCUMENTS

| | | | |
|---|---|---|---|
| 2,912,712 | 11/1959 | Shamban et al. | 16/2 |
| 3,773,969 | 11/1973 | Geisel | 220/345 X |
| 4,344,205 | 8/1982 | Latino et al. | 248/56 X |
| 4,520,976 | 6/1985 | Cournoyer et al. | 248/56 |
| 4,535,196 | 8/1985 | Milne | 16/2 X |
| 4,579,245 | 4/1986 | Narushko | 220/345 |

*Primary Examiner*—James T. McCall
*Attorney, Agent, or Firm*—Mann, McWilliams, Zummer & Sweeney

[57] ABSTRACT

A grommet arrangement for application to the upwardly facing working surfacing of an office desk top for acommodating application to and through the desk top of the plug and cabling of electrical and/or electronic equipment to be used at the desk, comprising a sleeve defining a cylindrical side wall in circumambient relation about the sleeve bore that is proportioned to freely receive both the equipment cabling and its plug, with the sleeve further defining a flanged end and a flanged free end, with the sleeve flanged end comprising a planar edging of quadrilateral configuration that is to seat flush against the desk top working surfacing about a hole formed in the desk top to receive the grommet cylindrical side wall, which grommet planar edging defines a recess that lies in a plane which extends crosswise of the grommet bore and receives a grommet closing cover snap fit fashion, with the grommet cover being shaped to define a cross slot and shiftably carrying on the underside of same an adjustable panel that selectively fully opens or closes the cover slot, for fully masking the grommet bore when no cabling is present; the grommet arrangement accommodates application of the equipment cabling and plugs therethrough for plug in to the usual electrical outlets by removing the cover, and after the cabling and its plug are in place the cover is reapplied and its adjustable panel is adjusted relative to the cover slot to both mask the cabling where it enters the grommet and accommodate such cabling in the cover slot.

9 Claims, 6 Drawing Figures

GROMMET ARRANGEMENT FOR OFFICE FURNITURE DESK TOPS

The present invention relates to a grommet arrangement for office furniture desk tops, and more particularly, to a grommet arrangement that may be applied to an office desk top for accommodating immediate or future application to the desk, through the desk top, of the plug and cabling for electric and/or electronic equipment that the user of the desk desires be plugged into the usual electrical outlet receptacle or receptacles adjacent the desk, or with which the desk is equipped, under the desk top, to facilitate the use of electric and/or electronic equipment.

Office desk use of various types of electrical and/or electronic type of equipment has long been common place, though with the wide spread use of computers and their accompanying CRT or other computer output display devices, the use of such equipment, particularly for automation, has become increasingly popular to the professional in particular and the business world in general. Office furniture desks specifically designed to electrically power such equipment commonly have electrical outlet receptacles under the desk top, and frequently on or in the front of the desk rear paneling or housing structure that is provided for this purpose along the back side of the desk, below the desk top, as distinguished from the front side of the desk (where the user of the desk normally works, whether seated or unseated). More commonly the desk has no electrical receptacle, but usually one is available in the vicinity of the desk.

When the desk user wishes to connect electrical and/or electronic equipment he wishes to use in connection with his work at the desk, the equipment cabling and plug must be somehow operably connected to the electrical outlets or receptacles available. This requirement in the past as been all too frequently met by stringing the cabling over the sides, rear, or front edge of the desk to extend the equipment cabling so that its plug will reach, for electrical application thereto, the available electrical receptacle. All too frequently the desk user finds that the cabling of the equipment involved is not long enough for the cabling plug to be applied to the available electrical outlet receptacle if the cable must be strung over one of the edges of the desk top to reach the electrical outlet receptacle or receptacles in question. On the other hand, where the top of the desk has been especially arranged or formed to receiving the cabling therethrough, the cabling plug, which normally has a transverse dimensioning is at least twice or more times the corresponding dimensioning of the cabling, has to be removed for feeding of the cabling through the desk top, after which the plug is reapplied to the cabling for application to the nearest electrical outlet or receptacle adjacent the desk, or with which the desk is equipped; in such cases, the equipment involved tends to be considered permanently associated with the particular desk in question because removal of the equipment from the desk involves labor intensive disconnection of the cabling plug from the cabling and reapplication of same thereto, in order to withdraw the equipment cabling from the desk.

A principal object of the present invention is to provide a grommet arrangement for application to office furniture desk tops that defines a bore which will accept both the cabling plug and the cabling, which grommet is arranged for application to a hole formed in the desk top at a desired location thereon and also is of low profile and includes a grommet bore closure cover so that the top of the desk in question may be pre-equipped with the grommet arrangement involved for use of the desk with the grommet in a closed and empty or dormant mode, as desired, or alternately, should the user of the desk wish to employ electrical and/or electronic equipment of the type indicated, the grommet cover may be removed and the equipment cabling and its plug passed through the grommet for effecting with ease the necessary electrical connection to the nearest outlet receptacle, whether at the underside of the desk or elsewhere, with the grommet cover being arranged for reapplication to the grommet to mask the cabling and at the same time accommodate the cabling positioning within the grommet, for convenient use at the desk in question, free of any equipment cabling passed around one of the desk edges.

A further principal objective of the invention is to provide a grommet arrangement for application to desk tops that not only accommodate the application therethrough of the plug and cabling, of a particular piece of electrical and/or electronic equipment the desk user desires to employ, as well as masking of the cabling where it enters the grommet, but also accommodates ready removal of the equipment cabling and plug from the desk, by merely removing the grommet cover, unplugging the cabling from the receptacle to which it is connected, and pulling the cabling and its plug through and out of the grommet.

Still another principal object of the invention is to provide a grommet arrangement for office furniture desk tops that may be permanently mounted on and in the desk top, and that is sufficiently unobtrusive at the end of same that is located above the desk top to permit normal use of the desk top, free of cabling extending therethrough, or, at any time, the grommet involved may be uncovered for ready application thereto of the cabling and its plug for a particular piece of such equipment for plug in association of the equipment cabling with the nearest available electrical outlet receptacle together with subsequent closure of the grommet and masking and ready accommodation of the equipment cabling passing into the grommet arrangement in question, which grommet arrangement also accommodates ready removal of the equipment cabling and its plug therethrough when use of such equipment is no longer desired, or the equipment is to be changed, etc.

Another important object of the invention is to provide a grommet arrangement for office furniture desk tops that is of all plastic construction, which plastic material may be one of the inexpensive and reliable materials that have long been used for forming fittings and the like, that involves a grommet structure of one piece construction and a cover therefor proportioned and arranged to fully close the grommet when empty, and to accommodate full removal therefrom for the equipment cabling and its plug through the grommet structure as applied to a desk top, and return of the grommet cover to the grommet structure for closing same, with cover adjustment being provided for to mask the equipment cabling where it enters the grommet, while being adjustable to accommodate the various sizes and types of cabling that are associated with the various types of electrical and/or electronic equipment employed for desk work purposes, as well as to provide for ready removal of equipment cabling and its plug for further use of the desk either free of such cabling and its plug, or the application through the grommet arrangement involved of the plug and cabling of another piece of such equipment.

In accordance with the present invention a grommet arranged for application to office furniture desk tops is provided comprising a grommet structure in the form of a cylindrical sleeve having a cylindrical side wall that defines the grommet bore, which sleeve has a flange free end and a flange end in the form of a planar edging extending crosswise of the grommet sleeve, and that is of open centered shape and is further shaped to define a quadrilaterally configured perimeter that overhangs the grommet sleeve and that is centered on the grommet sleeve.

The grommet sleeve flanged end further defines in centered relation to the grommet sleeve a recess that is coplanar with the grommet edging and that is of quadrilateral configuration and is proportioned relative to the grommet sleeve such that the recess corners overlie the grommet sleeve side wall and the midportions of the grommet recess sides overhang the grommet bore.

The grommet arrangement involved includes a cover of quadrilateral configuration that is proportioned for snap fit application within the grommet recess in coplanar relation with the grommet edging, and in coextensive relation to the recess. The grommet cover, while being proportioned to close off the grommet bore, is formed to define a cross slot that extends normally of one side edging of the cover toward the cover side edging that is on the opposite side of the cover, with the cover on its underside slidably mounting an adjustable panel for movement longitudinally of the cover slot, between a retracted position in which the cover slot is fully opened to the grommet bore, and an extended position in which the cover slot is fully closed by the panel. The relationship between the cover and its adjustable slot closing panel is such that in movement from its extended position toward its retracted position the panel is in frictional slip fit relation with the cover so that the panel can be adjusted relative to the cover to open only so much of the cover slot as will accommodate the equipment cabling that is to be applied through the grommet.

The invention contemplates that the grommet arrangement in question may be preapplied to both office furniture desks of the type that are equipped with electrical outlet receptacles, located, for instance at the front of the back of the desk and below the desk top, or to office furniture desks that are not so equipped, by applying the grommet arrangement involved to a hole or opening formed in the desk top which closely receives the grommet sleeve forming side wall, with the grommet edging seated firmly against the desk top; with the grommet cover being applied to the grommet and the cover adjustment panel in its fully extended, cover slot closing position, the desk top can be used in the normal way free of application of equipment cabling to the grommet. When the desk user desires to use equipment of electrical and/or electronic type that is to be plugged into electrical outlet receptacles (that are separate from but are in the vicinity of the desk, or that the desk itself is equipped with, as at the back or underside of the desk), the grommet cover is removed (as by employing finger pressure from the underside of the desk through the empty grommet), after which the equipment cabling and its plug, plug end first, may be readily passed through the grommet and electrically connected to the nearest available electrical outlet receptacle. The grommet cover then can be reapplied to the grommet, with the grommet cover adjustment panel adjusted to both accommodate the positioning of the cabling in the cover slot and mask such cabling where it enters the grommet.

Where the electrical and/or electronic equipment involved is to be removed, the grommet cover may be snapped free of the grommet by pulling upwardly on the cable, after which the cable plug may be removed from the outlet receptacle to which it has been connected, and then the cabling and its plug pulled through the grommet, after which the grommet cover may be snap fitted back onto the grommet with its adjustment panel moved to the fully closed or extended relation to fully mask the grommet bore. Alternately, the plug end cabling of a replacement piece of equipment may then be applied to the desk through the grommet and the grommet cover then replaced, as already described.

Other objects, uses, and advantages will be obvious or become apparent from a consideration of the following detailed description and the application drawings, in which like reference numerals indicate like parts throughout the several views.

In the drawings:

FIG. 1 is a diagrammatic perspective view of a desk of the type to which the invention is applicable, with the desk top being broken away, and showing one embodiment of the grommet arrangement of the present invention applied to the desk top of the desk illustrated, with the grommet arrangement there illustrated being free of equipment cabling passing therethrough, but being available for ready application of equipment cabling and its plug therethrough to electrically connect the equipment to the electrical outlet receptacles that are located acjacent the desk, or with which the desk is equipped underneath the desk top;

However, it is to be distinctly understood that the specific drawing illustrations provided are supplied primarily to comply with the requirements of the Patent Laws, and that the invention is susceptible of variations and modifications that are intended to be covered by the appended claims.

GENERAL DESCRIPTION

Figure 1:
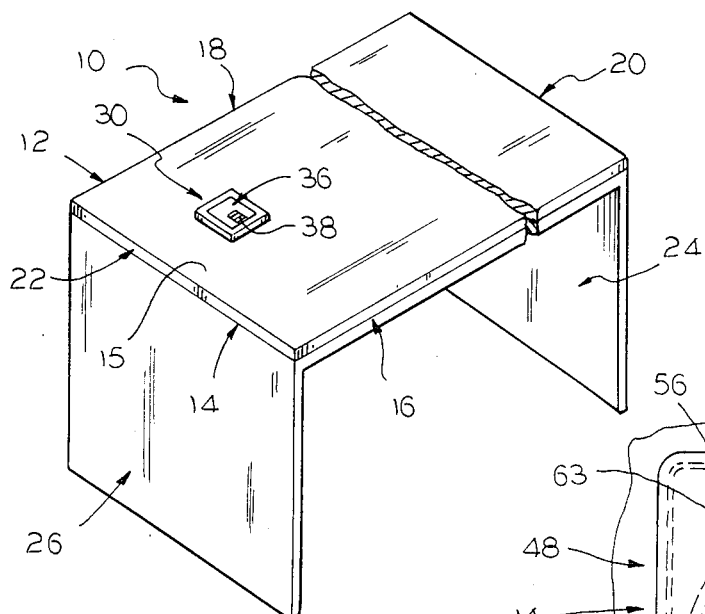

Reference numeral 10 of FIG. 1 generally indicates an office furniture desk of a type commonly encountered in business offices. Ordinarily such desks 10 are not equipped with an electrical outlet receptacle into which equipment of the electrical and/or electronic type can be plugged for electrical energy source purposes. Desk 10 comprises a desk top structure or unit 12 that includes a desk top 14 having an upwardly facing working surface 15. The desk top 14 includes a front edging 16 where the desk user is to be seated or stationed, a back or rear edging 18 that is on the opposite side of the front edging 16, and the usual right and left hand edgings 20 and 22 that define the corresponding ends of the desk 10. The desk top 14 is conventionally supported from the floor, as by conventional right and left hand panel legs 24 and 26 (that are shown in phantom).

It is assumed that adjacent the desk 10 the building in which it is housed defines a wall structure having one or more familiar forms of electrical outlet receptacles adjacent or at least in the vicinity of the desk 10, or the desk 10 adjacent its rear edging 18, but below same, is equipped with electrical apparatus including outlet receptacles (not shown) which are suitably electrically energized from a source of electrical power by appropriate electrical connection to the desk 10. For this purpose the desk top 10 may be equipped along, but inwardly of, its rear edging 12, with a suitable trough structure for holding the wiring and receptacles involved, with the outlet receptacles to which electrical and/or electronic equipment that may be employed by the user of the desk 10 is to be plugged into by way of, for instance, outlet receptacles anchored in the wall structure of the trough that faces the user of the desk underneath the desk top 14.

As is well known to professionals and those in the business world, various types of electrical and/or electronic equipment are available to assist workers active in the fields of accounting, engineering, architecture, law, or the like, which equipment is electrically operated and thus necessarily includes the usual cords equipped with an end plug that is pronged for application to the usual electrical receptacle that in turn is connected to the source of electrical energy. Heretofore this has required that the desk user apply the electrical cordage to the closest outlet receptacle in the vicinity of the desk, or if the desk is equipped with an outlet receptacle of the type indicated, such cordage is applied to the desk outlet receptacle, with the equipment cordage draped over one of the edges of the desk; where the desk top 14 has been specifically formed to define aperturing through which the equipment cabling can be extended, free of the cabling plug, such cabling has to remain more or less permanently plugged into the desk outlet receptacle after the cabling plug has been reconnected to the cable, to avoiding the labor problems inherent in later removal of the cabling.

In accordance with the present invention, the grommet arrangement 30 is provided for application to the desk top 14 at any desired location over the desk's top working surfacing 15 to provide, when needed, a ready way of passing the equipment end plug and cabling or cordage through the desk top 10, and connecting the cabling end plug to the nearest electrical outlet receptacle, whether located in the under part of the desk, or elsewhere, as needed to quickly put the equipment in question into operation, or alternately, just arrange the desk 10 to be available for this purpose while the desk 10 continues to be used in the normal manner, or when a given piece of equipment has been electrically connected in the manner indicated, to permit a rapid change over to another form of electrically operated equipment, by way of the grommet arrangement 30.

Figure 2:
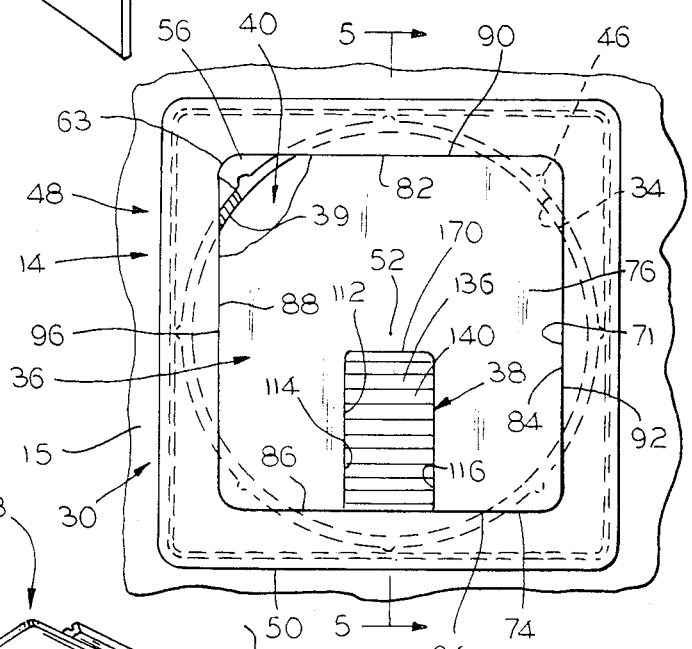
FIG. 2 is a top plan view of the grommet arrangement of FIG. 1, as applied to the desk top in question, with parts shown broken away.
Figure 3:
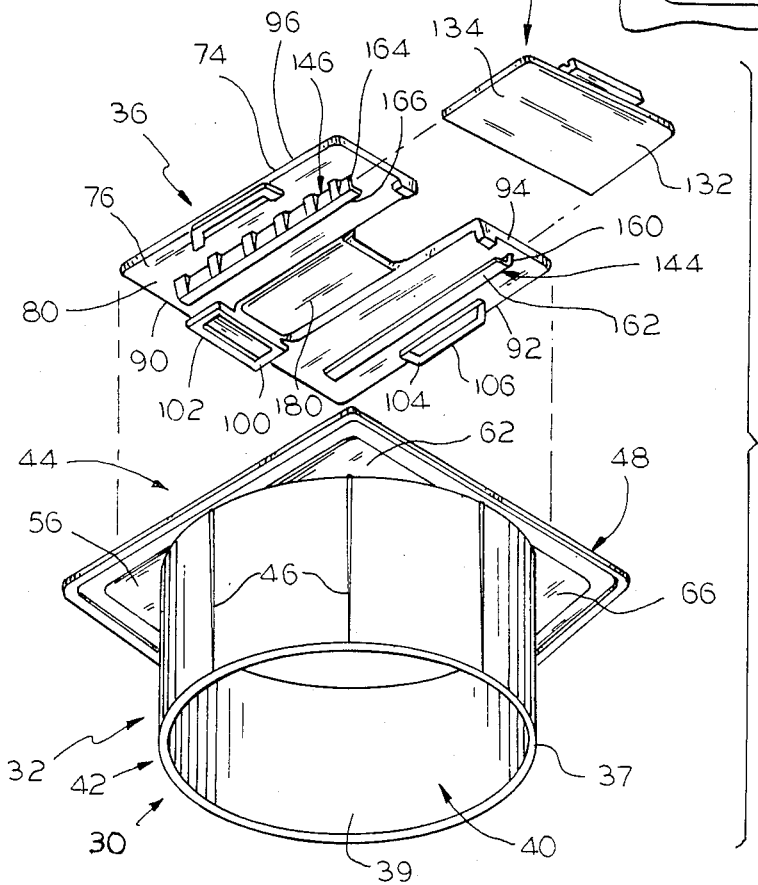
FIG. 3 is an exploded perspective view of the grommet arrangement per se, taken from the lower left hand side of the grommet there shown in FIGS. 1 and 2, but free of the desk top involved.
Figure 4:
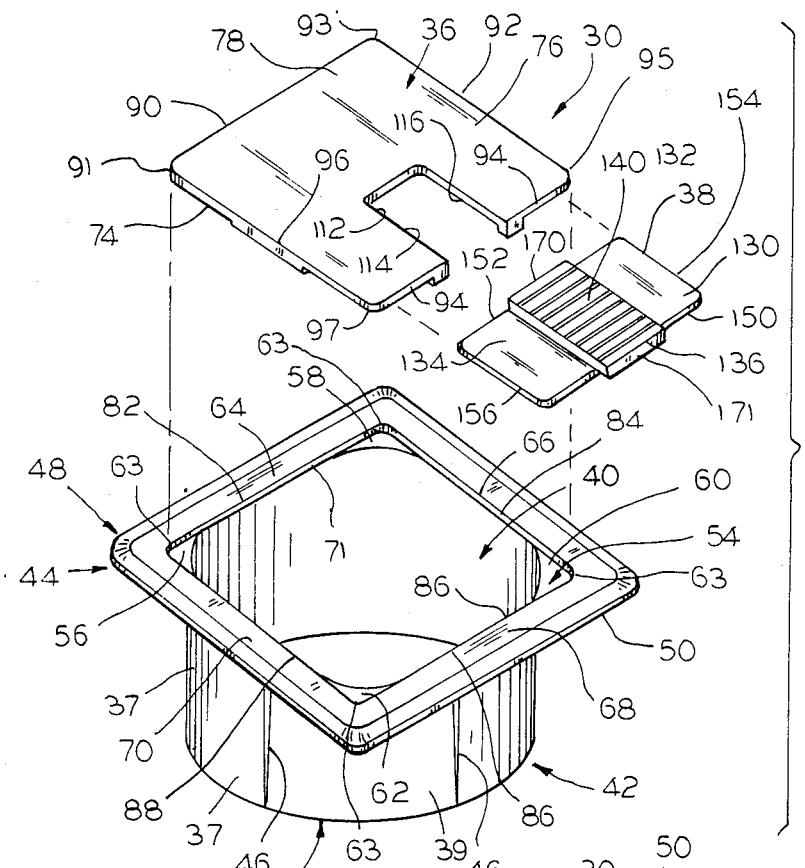
FIG. 4 is an exploded perspective view similar to that of FIG. 3, but taken from the upper left hand side of the grommet arrangement as illustrated in FIGS. 1 and 2.
Figure 5:
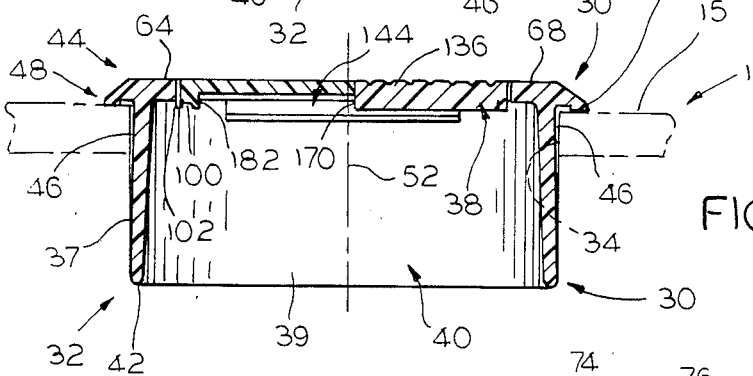
FIG. 5 is a longitudinal cross section through the assembled grommet arrangement, taken approximately along line 5—5 of FIG. 2.

As indicated in FIGS. 3-5, the grommet arrangement 30 comprises a grommet structure 32 which is to be applied through a through aperture 34 suitably formed in the diagrammatically illustrated desk top 14 to mount the grommet arrangement 30 in the desk top 14 in the manner suggested in FIGS. 1, 2, and 5. The grommet arrangement 30 also includes a grommet cover 36, and an adjustable panel 38 that is slidably and adjustably carried by the grommet cover 36.

The grommet structure 32 in the specific form illustrated comprises a cylindrical sleeve 37 defining a cylindrical side wall 39 which forms a circular grommet bore 40. The grommet sleeve 37 has an unflanged end 42 and a flanged end 44, it being the unflanged end 42 that is inserted through the aperture 34 that is to be formed in the desk top 14 to mount the grommet arrangement 30 therein.

As indicated in the drawings, the grommet sleeve side wall 39 may be formed with spaced longitudinally extending ribs 46 that may be tapered axially of the side wall 39 for permitting a force fit type application of the grommet structure 32 within the desk top aperture 34. The desk top aperture 34 may be formed in any suitable manner, as by employing a suitable drill or the like.

The grommet structure flanged end 44 includes planar edging 48 that is in integral one piece relation with the grommet side wall 39, that is centered on the grommet side wall 39, and that is of quadrilateral configuration, whereby the edging 48 defines a perimeter 50 of quadrilateral configuration that overhangs the sleeve side wall 39, and that is both planar in configuration and lies in a plane that is normally disposed to the longitudinal axis 52 of the grommet structure bore 40, for making flush engagement with a desk top surfacing 15 when the grommet structure 32 is applied to the desk 10 (see FIG. 5).

As indicated in FIGS. 2, 4, and 5, the edging 48 is formed to define a recess 54 of planar, quadrilateral configuration that is in coplanar relation with the plane of the edging 48. The recess 54 is proportioned relative to the grommet structure side wall 39 such that the edging 48 defines corner lands 56, 58, 60, and 62, that overlie the grommet structure side wall 39, and at the four corners 63 of the quadrilateral recess 54. Intermediate the respective four corners of the recess 54, the edging 48 defines rectilinear portions 64, 66, 68 and 70, that overhang the grommet structure side wall 39 and within the grommet bore 40. The recess corners 63 and rectilinear portions 64, 66, 68, and 70 together define the recess perimeter 71 that is quadrilateral in configuration.

The grommet arrangement 30 is completed by a generally planar cover 36 that about its perimeter 74 is proportioned relative to the recess 54 for snap fit application thereto to close the grommet bore 40.

Figure 6:
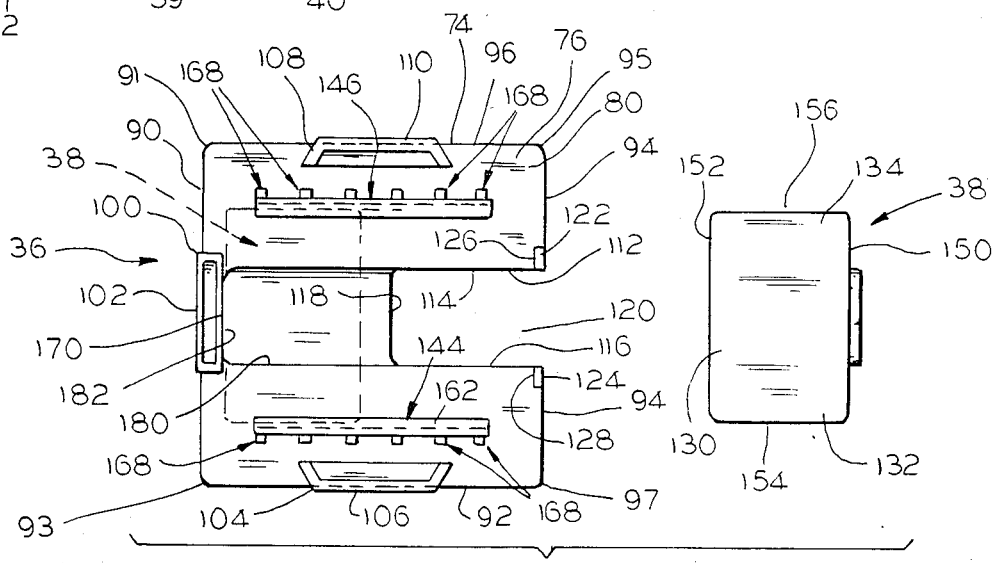
FIG. 6 is a plan view of the underside of the grommet cover and adjustable panel therefor, showing the panel displaced to the right of the cover in full lines, and showing the panel in its fully retracted position in dashed lines.

The cover 36 comprises a generally planar plate 76 formed to define the indicated quadrilateral marginal configuration 74 and shaped to define an essentially planar upper surface 78 and in essentially planar undersurface 80; as indicated in FIGS. 3 and 6, the plate 76 has associated with its undersurface 80 and integral therewith a number of important structural features that will be discussed at length hereinafter.

As will be observed from the showing of FIGS. 2 and 4, the grommet structure recess perimeter 71 defines rectilinear sides 82, 84, 86 and 88, while the cover plate 76 defines corresponding rectilinear sides 90, 92, 94, and 96 forming perimeter 74 that is essentially quadrilateral in configuration. The perimeter 74 of cover also defines the cover corners 91, 93, 95 and 97. As has been heretofore indicated, the cover 36 is to have snap fit application to the recess 54. For this purpose, the underside 80 of the plate 76 is provided with, at its rectilinear side 90, a depending lug 100 having an outer marginal edging 102 that is to be snap fitted under the side 82 of the recess 54.

At the rectilinear edge 92 of the plate 76, the underside 80 of the plate 76 defines a depending lug 104 having an outwardly extending edging 106 that is to be snap fitted under the rectilinear edge 84 of the recess 54, while the underside 80 of the plate 76 at its rectilinear edge 96 is formed with a similar depending lug 108 having outwardly extending edging 110 that is to be snap fitted under the rectilinear edging 88 of recess 54.

As is also indicated in FIGS. 3, 4 and 6. the plate 76 is formed to define a through slot 112 that is generally of "U" configuration defining rectilinear sides 114 and 116, and rectilinear end 118, with the slot 112 being open as at 120 at the rectilinear side edge 94 of cover 36.

The plate 76 forming the cover 36 on either side of the slot open end 120 defines at its underside 80 a pair of depending stop lugs 122 and 124 that form the respective stop surfaces 126 and 128 that are in coplanar relation in a plane that parallels the cover side 94.

The adjustable panel 38 that is operably associated with the cover 36 comprises a generally quadrilateral plate 130 formed to define a pair of generally rectangular wings 132 and 134 that project from either side of a central land 136 that is upstanding from the plate 130, which land 136 is proportioned to substantially fill or close off the slot 114 when the panel 38 is positioned for this purpose; the upper surfacing of the land 136 is knurlled as indicated at 140 for ease of handling when the cover 36 is snap fit mounted in recess 54.

The underside 80 of the cover 36 is further formed to define opposed trackways 144 and 146 that are integral with the cover 36, and in which the respective wings 132 and 134 of the panel 38 are respectively slidably mounted to provide movement of the panel 38 from the broken line retracted position of FIG. 6, wherein the panel 38 including its land 136 is fully retracted under the cover 36 (and separated from cover slot 112), and the extended position indicated in FIG. 2 and 5, wherein the land 136 of the panel 138 is disposed to fill the slot 112. The adjustable panel 38, it will be seen, defines rectilinear front and rear edges 150 and 152, and rectilinear side edges 154 and 156; when the adjustable panel 38 is positioned as indicated in FIG. 2 so that the land 136 fills the slot 112, the panel rectilinear edge 150 is in substantial abutting relation to the respective stop surfaces 126 and 128 of the respective depending lugs 122 and 124.

The trackway 144 is of depending angle shaped configuration comprising a depending flange 160 to the lower margin of which a cross flange 162 is integrally connected on which the wing 132 of the adjustable panel 38 rides. Similarly, the trackway 146 comprises depending flange 164 to the lower edge of which cross flange 166 is integrally connected on which the wing 134 of the adjustable panel 38 rides. The respective flanges 160 and 164 may be suitably reinforced by the respective reinforcing spaced ridges where indicated at 168.

A feature of the invention is that when the panel 38 is positioned so that its land 136 is congruent with the slot 212, the panel wings 132 and 134 are disposed in substantial coplanar parallelism, and freely engage the respective trackways 144 and 146; in this position, the panel land rectilinear edging 152 engages the cover 36 at the slot inner end 118, and this, together with juxtapositioning of the panel edging 150 at the stop surfaces 126 and 128 of cover 36, preclude the panel 38 from being freely shifted in either direction from the position of the panel in which its land 136 occupies slot 112, as shown in FIG. 2. However, by finger pressing downwardly on the panel land 136 (when panel 38 is positioned as indicated in FIGS. 2 and 5) the panel 38 may be deflected downwardly so that the land 136 may be frictionally moved or shifted to the fully retracted broken line position of FIG. 6, wherein the land 136 is totally received under the undersurfacing 80 of the cover 36. When the panel 38 is so deflected, the panel and its land 136 and the outwardly extending edges 154 and 156 of its wings 132 and 134 are in frictional contact relationship with the cover 36, and specifically with its undersurfacing 80 (where land 136 contacts same) and its trackways 144 and 146, respectively. As indicated in FIG. 6, the undersurface 80 of the cover 36 is indented as at 180 to fully receive the land 136 when the end 170 of same abuts the inner edging 182 of the lug structure 100 (see FIG. 6).

The assembled relation of the grommet cover 36 comprises the adjustable panel 38 positioned relative to the cover 36 so that its land 136 fills the cover slot 112, with the panel 38 thus then being disposed between the cover stop surfaces 126 and 128, and the slot inner end 118. The cover 36 may then be snap fitted into the recess 54 of grommet structure 32 so as to lie in coplanar relation therewith, this being done by applying the assembled cover 36 and its adjustable panel 38 (positioned relative to the cover 36 as indicated) in substantial congruency with the recess 54, and then finger pressing the cover 36 down into the recess 54 so that the cover edgings 102, 106, and 110, are snap fit received under the recess rectilinear margins that they are applied against. Since the cover 36 and the recess 54 are of square configuration, the assembled cover 36 may be applied to the recess 54 in any one of the four possible positions relative thereto that the respective corners of the cover may be applied in congruency with the respective corners of the recess 54, in applying these two components together.

The grommet arrangement 30 is applied to a desk 10, as by appropriately forming an aperture 34 in the desk top 14 using a suitable drilling tool or the like, with the aperture 34 being proportioned for force fitting of the grommet structure 32 down within the aperture 34, considered in light of the tapering of the grommet structure ribs 46, to bring the grommet structure edging 48 into flush relation with the upwardly facing working surfacing 15 of the desk top 10. The grommet side wall 39 should have an internal diameter that permits grommet arrangement 30 to accept and thus permit the passage of cabling plugs of the widths currently employed on equipment of the type indicated. For this purpose the side wall 39 of the grommet structure should have an internal diameter that preferably lies at least on the range of from about two and one-half inches to about three inches, with the remainder of the grommet arrangement (and aperture 34) being proportioned accordingly.

With this grommet arrangement 30 applied to the desk 10 in this manner, the desk 10 may be employed for normal usage purposes without any electrical equipment applied to the grommet arrangement 30, due to the relatively planar and unobtrusive nature of the grommet arrangement 30 as applied to the desk top 10. The cover 36 with its adjustable panel 38 applied as indicated in FIG. 2 completely masks the bore 40 that is defined by the grommet arrangement in question.

In the event that the user of the desk 10 desires to employ equipment of the electrical and/or electronic type which has the usual cording and plug for application to electrical outlets available in the vicinity of or adjacent the desk, or mounted in the desk under its top 14, the desk user reaches under the desk top 10 to pop the cover 36 and its associated adjustable panel 38 out of the grommet structure 32 using finger pressure or the like on the underside of the cover 36. With the cover 36 removed from the grommet structure 32, the grommet structure bore 40 is fully exposed to conveniently receive the end plug and cabling of the equipment involved, which are then passed readily through the grommet structure 32, so that the end plug involved can be appropriately connected to the electrical energy outlet that is available adjacent to, or in and under the desk. The cover 36 is the grasped and the panel 38 is laterally deflected and slipped to the retracted position of FIG. 6, whereupon the cover 36 is reapplied, snap fit fashion, to the grommet arrangement recess 54, with the cabling of the equipment involved being first disposed within the slot 112. After the cover 36 has been snap fitted within the recess 54, the adjustable panel 38 is finger shifted in the direction of the cabling to bring the end 171 of the panel land 136 against the cabling, for partially masking same and also moving the land 136 of the panel 38 against the cabling to fill as much of the slot 112 with the land 136 as is permitted by the presence of the cabling in the outer end portion 120 of the slot 112. The panel 38 is frictionally held against displacement from such position by the frictional engagement land 136 has with the cover 36 at its indentation 180, and the frictional engagements the cover wings 132 and 134 have with the respective trackways 142 and 144.

The user of the desk is now able to use the equipment he has now installed without having to run the equipment cabling over a front, side, or rear edging of the desk, and with the cabling partially masked where it enters the grommet arrangement 30 and cover 36 and the partially extended adjustable panel 38.

Use of the particular piece of equipment in question can proceed as usual. When it is desired to remove the particular piece of equipment in question from the desk 10, its cabling end plug can be disconnected from the outlet receptacle to which it is applied, the cabling pulled slightly to dislodge the cover 36 from the grommet arrangement recess 54, and the cabling and end plug pulled completely out of the grommet structure for removal from the desk. On replacement of the cover 36 to the grommet structure recess 54, and the positioning of the adjustable panel 38 land to fill the slot 112, the grommet structure is restored to its same unobtrusive condition before the cabling of the indicated equipment is applied thereto. Cabling of different or the same equipment, together with the end plugs of same, can be similarly applied through the grommet arrangement 30 as needed to operatively connect same to the source of electrical energy available as indicated.

The grommet structure 32, the cover 36, and the adjustable panel 38 may be formed from ABS plastic material or its equivalent, with the grommet structure 32 being of one piece integral construction in the preferred embodiment. The cover 36 and its panel 38 are separate members because of the movement that the adjustable panel 38 is to have relative to the cover 36.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a cable grommet for application to an office furniture desk top for adapting the desk top to receive electrical cabling through the desk top, the improvement wherein the grommet defines a bore proportioned to removably receive and pass therethrough both cable and a plug equipped end of same, for mounting the cable in the desk top to extend through the grommet bore for application of the cable plug to a source of electrical energy for electrically operating electrically operated equipment operably connected to the other end of the cable and resting on the desk top, said improvement comprising:

a sleeve having a side wall defining a bore that forms the grommet bore, a flange free end, and a flanged end that extends laterally outwardly of said sleeve said wall, said sleeve flanged end comprising a planar edging disposed crosswise of said sleeve bore and having an internal perimeter that is open to said sleeve bore and an outer perimeter that overhangs said sleeve side wall outwardly thereof and is centered with respect to said sleeve, said sleeve bore extending through said sleeve flange free end, said sleeve flanged end edging further defining in centered relation to said sleeve a recess that is congruent with said edging internal perimeter and has a marginal perimeter thereabout, spaced portions of which overlie the sleeve side wall and other spaced portions of which overhang said sleeve bore, said sleeve bore, said sleeve edging internal perimeter, and said recess being proportioned to receive and pass therethrough both the cable end and the cable plug at such plug equipped end of same, and a cover proportioned for snap fit reception into and out of said sleeve edging recess in substantial coplanar relation with said recess across the sleeve bore in substantial coextensive relation to said recess, said cover defining a top side, an underside, and an elongate through slot extending substantially crosswise of said cover from one edge thereof, and between said cover sides, said cover slot being proportioned transversely thereof and therealong for receiving the cable therein in close fitting relation thereto, said cover having an adjustable panel shiftably mounted on the same for movement longitudinally of said slot, for movement between a retracted position in which said cover slot is fully opened to said sleeve bore, and an extended position in which said cover slot is fully closed by said panel, when said cover is in said snap fit reception in said sleeve edging recess, whereby, when said sleeve is mounted in the desk top, with said flanged end of said sleeve overlying the desk top and said flange free end of said sleeve being directed downwardly of the desk top, said cover with said panel thereof in its said extended position may be disposed in its said snap fit reception in said sleeve edging recess to mask said sleeve bore when the grommet is free of the cabling, and when a cable and its plug equipped end are to be applied to the grommet, said cover is snap fit removed from said sleeve edging recess, the cable plug equipped end and the cable length connected thereto are passed through said sleeve internal perimeter, said sleeve recess, said sleeve bore, and said sleeve flange free end, for application of the cable plug to the source of electrical energy, and said cover with said panel thereof being disposed in its said retracted position is returned to its said snap fit relation in said sleeve edging recess with said panel slot receiving therein the cable, said panel may be shifted from its said retracted position toward its said extended position and into abutting relation with the cable for masking both said sleeve bore and the entry of the cable into said sleeve bore, and whereby when the cable and its plug equipped end are to be removed from the grommet, on freeing of the cable plug from the source of electrical energy, the cable portion above said grommet cover may be manually pulled to snap fit remove said cover from said sleeve edging recess, and the cable and its end plug may be manually pulled out of said grommet for removal from the desk top.

2. The grommet improvement set forth in claim 1 wherein:

said cover adjustable panel is mounted on the underside of said cover, said cover adjustable panel including a land portion having a marginal configuration that substantially complements that of said slot, said adjustable panel being shiftable relative to said cover for snap fitting of said land of said panel within said cover slot in said extended position of said panel relative to said cover when said grommet is free of the cable.

3. The grommet improvement set forth in claim 2 including:

stop means for limiting movement of said adjustable panel from its said retracted position to its said extended position at the position thereof wherein panel land is in said snap fit relation with said cover slot.

4. The grommet improvement set forth in claim 3 including:

means for force fit movement of said panel on said cover for frictional movement of said panel between said extended position thereof and said retracted position thereof, whereby said panel may be selectively disposed between said two positions for partial opening of said slot.

5. In an office furniture desk including a generally flat desk top, defining a flat upwardly facing work surfacing, leg means for supporting same from a floor in a substantially horizontal position, and a cable grommet mounted in the desk top for adapting the desk top to receive and pass through same electrical cable for application of the cable to a source of electrical energy for electrically operating electrically operated equipment resting on the desk top working surface and electrically connected to the cable, the desk improvement wherein:

said cable grommet of said desk top work surfacing defines a bore proportioned to removably receive and pass therethrough both the cable and a plug equipped end of same, for accommodating extension of the cable through the desk top for application of its plug to a source of electrical energy for electrically operating such equipment, said grommet further comprising:

a sleeve having a side wall defining a bore that forms said grommet bore, a flange free end, and a flanged end that extends laterally outwardly of said sleeve side wall, said sleeve flanged end comprising a planar edging disposed crosswise of said sleeve bore and having an internal perimeter that is open to said sleeve bore and an outer perimeter that overhangs said sleeve side wall outwardly thereof and is centered with respect to said sleeve, said sleeve bore extending through said sleeve flange free end, said sleeve flanged end edging further defining in centered relation to said sleeve a recess that is substantially congruent with said edging internal perimeter and has a marginal perimeter thereabout, first spaced portions of which overlie the sleeve side wall and other spaced portions of which overhang said sleeve bore, said sleeve bore, said sleeve edging internal perimeter, and said recess being proportioned to receive and pass therethrough both the cable and the cable plug at such plug equipped end of same, and a cover proportioned for snap fit reception into and out of said sleeve edging recess in substantial coplanar relation with said recess across the sleeve bore in substantial coextensive relation to said recess, said cover defining a top side, an underside, and an elongate through slot extending substantially crosswise of said cover and between said cover sides, said cover slot being proportioned transversely thereof and therealong for receiving the cable therein in close fitting relation thereto, said cover having an adjustable panel shiftably mounted on same for movement longitudinally of said slot, for movement between a retracted position in which said cover slot is fully opened to said sleeve bore, and an extended position in which said cover slot is fully closed by said panel, when said cover is in said snap fit reception in said sleeve edging recess, said sleeve side wall extending through the desk top with said sleeve edging being in substantial abutting relation with the desk top working surfacing and said cover top side facing upwardly of the desk top working surface, whereby, when the grommet is cable free and said cover with said panel in its said extended position is disposed in its said snap fit reception in said sleeve edging recess, said cover masks the sleeve bore when said grommet is free of the cabling, and when the cable and its plug equipped end are to be applied to the grommet, said cover is snap fit removed from said sleeve edging recess, the cable plug equipped end and the cable length connected thereto are passed through said sleeve edging internal perimeter, said sleeve recess, said sleeve bore, and said sleeve flange free end, for application of the cable plug to the source of electrical energy, and said cover with said panel thereof being disposed in its said retracted position is returned to its said snap fit relation in said sleeve edging recess with said panel slot receiving therein the cable, said panel may be shifted from its said retracted position toward its said extended position and into abutting relation with the cable for masking both said sleeve bore and the entry of the cable into said sleeve bore, and whereby when the cable and its plug equipped end are to be removed from the grommet, on freeing of the cable plug from the source of electrical energy the cable length portion above said grommet cover may be manually pulled to snap fit remove said cover from said sleeve edging recess, and the cable and its end plug may be manually pulled out of said grommet for removal from the desk top.

6. The desk improvement set forth in claim 5 wherein:

said cover adjustable panel is mounted on the underside of said cover, said cover adjustable panel including a land portion having a marginal configuration that substantially complements that of said slot, and said cover and its adjustable panel being shaped for snap fitting of said land of said panel within said cover slot in said extended position of said panel relative to said cover to close said cover when said grommet is free of the cable.

7. The desk improvement set forth in claim 6 including:

stop means for limiting movement of said adjustable panel from its said retracted position to its said extended position at the position thereof wherein panel land is in said snap fit relation with said cover slot.

8. The desk improvement set forth in claim 7 including:

means for force fit movement mounting of said panel on said cover for frictional movement of said panel between said extended position thereof and said retracted position thereof, whereby said panel may be selectively disposed between said two positions thereof for partial opening of said slot relative to the desk top working surfacing.

9. The improvement set forth in claim 5 wherein:

said grommet is located adjacent a side edge portion of the desk top working surface.

* * * * *